United States Patent [19]

Brown

[11] Patent Number: 5,017,240
[45] Date of Patent: May 21, 1991

[54] VAPOR TREATMENT FACILITIES FOR PETROLEUM STORAGE TANK CLEANING

[76] Inventor: Earnest D. Brown, 8001 Cheshire Cir., La Palma, Calif. 90623

[21] Appl. No.: 474,514

[22] Filed: Feb. 2, 1990

[51] Int. Cl.$^5$ .............................. B08B 9/00; B08B 5/00
[52] U.S. Cl. ........................................ 134/22.1; 134/10; 134/31; 62/48.2; 55/62
[58] Field of Search ................................ 62/48.2, 55.5; 134/22.1, 31, 10; 208/340; 55/62

[56] References Cited

U.S. PATENT DOCUMENTS

| | | | |
|---|---|---|---|
| 3,266,262 | 8/1966 | Moragne | 62/54 |
| 4,331,456 | 5/1982 | Schwartz et al. | 55/26 |

FOREIGN PATENT DOCUMENTS 2098874  12/1982  United Kingdom ................. 62/48.2

Primary Examiner—Theodore Morris
Assistant Examiner—Saeed Chaudhry
Attorney, Agent, or Firm—Plante, Strauss, Vanderburgh & Connor

[57] ABSTRACT

There is disclosed a method for the removal and recovery of hydrocarbons which are contained within the air/vapor mixture in bulk oil or gasoline storage tanks using fractional condensation with cryogenic cooling. The air/vapor mixture is flushed from the tank with fresh air and passed, successively, through several stages of a portable condenser train. When necessary, the first stage of the treatment comprises a caustic wash stage where the air/vapor mixture is contacted completely with a caustic solution to remove sulfur compounds. The desulfurized air/vapor mixture is then passed to the first condenser stage which condenses and removes substantially all moisture within the mixture. The de-humidified, desulfurized mixture is then passed to an intermediate stage where the heavier hydrocarbon fractions are condensed and separated and is then passed to a final condenser stage where it is cooled to a temperature of at least −100 degrees F., sufficient to condense substantially all hydrocarbon component therein. The cooling is accomplished cryogenically with direct or indirect heat exchange in each of the condenser stages, using liquid nitrogen. The treated air from the final condenser can be recycled as a source of the air to flush the bulk oil or gasoline storage tank.

16 Claims, 3 Drawing Sheets

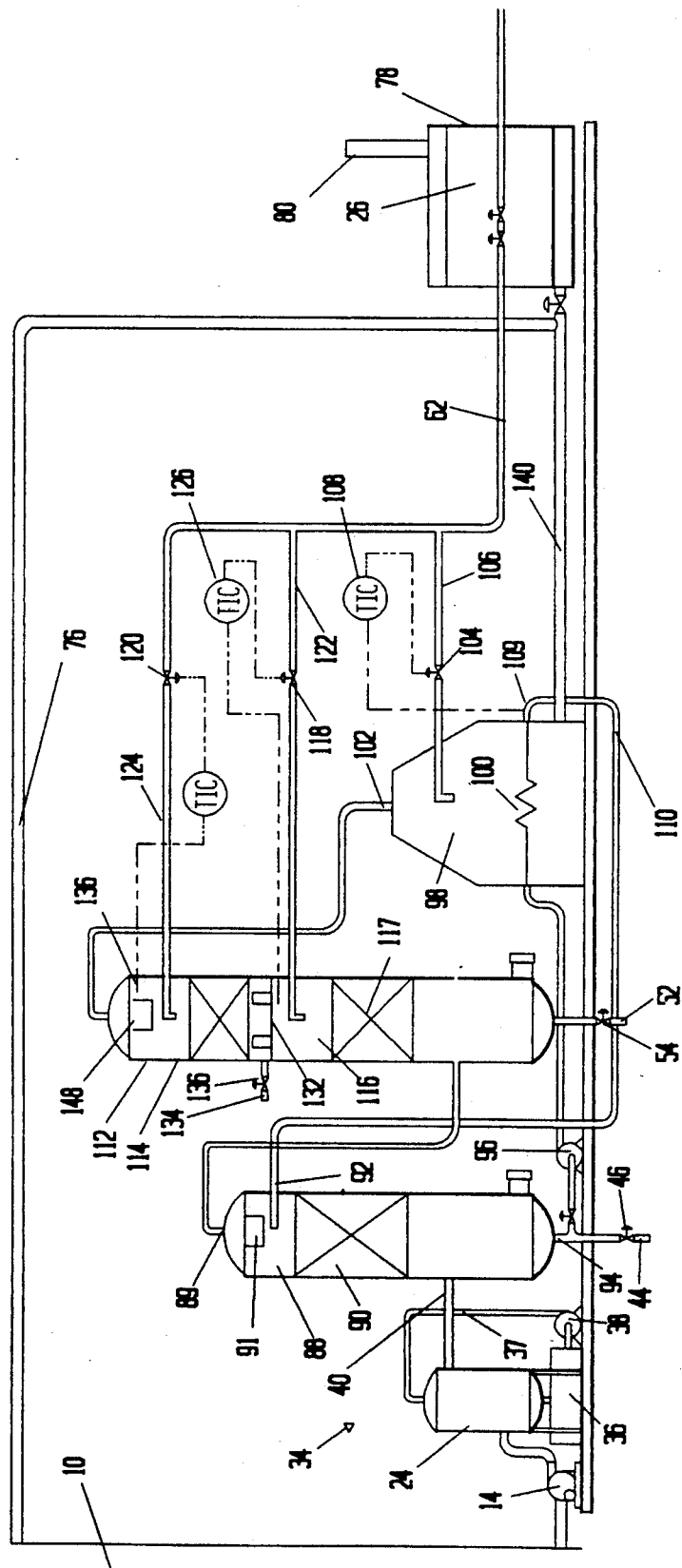

VAPOR TREATMENT FACILITIES FOR PETROLEUM STORAGE TANK CLEANING

BACKGROUND OF THE INVENTION

1. Field of the Invention

This invention relates to vapor treatment facilities and, in particular, to the application of such facilities in cleaning of petroleum storage tanks.

2. Brief Statement of the Prior Art

Petroleum and its volatile products are stored at bulk terminals, refineries and the like in floating or fixed roof tanks. In floating roof storage tanks, the tank roof floats on the liquid contained within the tank, thereby greatly reducing the volume of vapor over the liquid in the tank. Although these tanks minimize the volume of vapors which are discharged to the atmosphere during operations, substantial quantities of vapors are discharged to the environment when the tank is completely emptied, as the floating roof descends to a minimum height which is approximately 6 feet above the bottom of the tank. The tanks are cleaned periodically, and it is necessary to flush the mixture of air and hydrocarbon gases within the tank with fresh air, until the hydrocarbon content of the mixture is sufficiently low to permit workmen to enter the tank for cleaning operations.

During storage of volatile petroleum distillate products such as gasoline, the mixture of air and gasoline vapors within the tank can contain up to about 35 percent hydrocarbons. Additionally, unrefined petroleum crude products such as untreated sour hydrocarbons, can contain sulfur compounds such as mercaptans, hydrogen sulphide, sulfur dioxide and the like. The discharge of the hydrocarbons or the sulfur compounds into the atmosphere during flushing of the tanks of increasing environmental concern. In some areas of the country, notably Southern California, existing or threatened legislation will prohibit the discharge of this vapor/air mixture directly into the atmosphere.

Various refrigeration units have been proposed to recover vapors from underground gasoline storage tanks at gasoline service stations, or other low volume sources of hydrocarbons, prior to filling of these tanks. These tanks, however, are very small in comparison to the large bulk storage tanks at oil terminals and refineries, and the prior units are far undersized for use in treating the air/vapor mixture from a bulk oil storage tank. Additionally, service station sites are readily accessible and have electrical power supplies which accommodate a portable refrigeration unit, conditions which are seldom present a bulk petroleum storage tank sites.

OBJECTIVES OF THE INVENTION

It is an object of this invention to provide a treatment facility for recovery of the hydrocarbon from the air/vapor mixture present in bulk oil storage tanks prior to cleaning of the tanks.

It is a further object of this invention to provide a condenser train which can be used to recover up to 90% or greater of the hydrocarbons contained within the vapor space of a bulk storage tank used for petroleum distillates.

It is a further object of this invention to provide a condenser train which has facilities for the removal of objectionable impurities such as sulfur compounds from air and hydrocarbon mixtures.

It is also an object of the invention to provide a condenser train utilizing cryogenic cooling, thereby eliminating requirements for on site compressor and power generation units necessary for traditional refrigeration systems.

It is also a further object of this invention to provide a condenser train which will provide cooling of the air/vapor mixture within a petroleum storage tank to temperatures of $-100$ degree F., or lower.

It is a further object of this invention to provide a highly portable and self contained system for recovering hydrocarbons from air mixtures which can be taken to remote locations such as tank farms.

Other and related objects will apparent from the following description of the invention.

BRIEF DESCRIPTION OF THE INVENTION

This invention comprises a method for the removal and recovery of hydrocarbons which are contained with the air/vapor mixture in bulk oil or gasoline storage tanks. In the invention the air/vapor mixture is flushed from the tank and passsed successively, through several stages of a condenser train which is cryogenically cooled. When necessary, the first stage of the treatment comprise a caustic wash stage where the air/vapor mixture is contacted completely with a caustic solution to remove sulfur compounds. The desulfurized air/vapor mixture is then passed to the first condenser stage which condenses and removes substantially all moisture within the mixture. The dehumidified, desulfurized mixture is then passed to an intermediate stage where the heavier hydrocarbon fractions are condensed and separated and is then passed to a final condenser stage where it is cooled to a temperature of at least $-100$ degrees F., sufficient to condense substantially all hydrocarbon components therein. The cooling is accomplished cryogenically with direct or indirect heat exchange in each of the condenser stages, using liquid nitrogen. The treated air from the final condenser can be recycled as a source of the air to flush the bulk oil or gasoline storage tank.

BRIEF DESCRIPTION OF THE DRAWINGS

The invention will be described relative to the figures of which:

FIG. 4 illustrates another application of the invention using direct contact, cryogenic cooling.

DESCRIPTION OF THE PREFERRED EMBODIMENT

Figure 1:
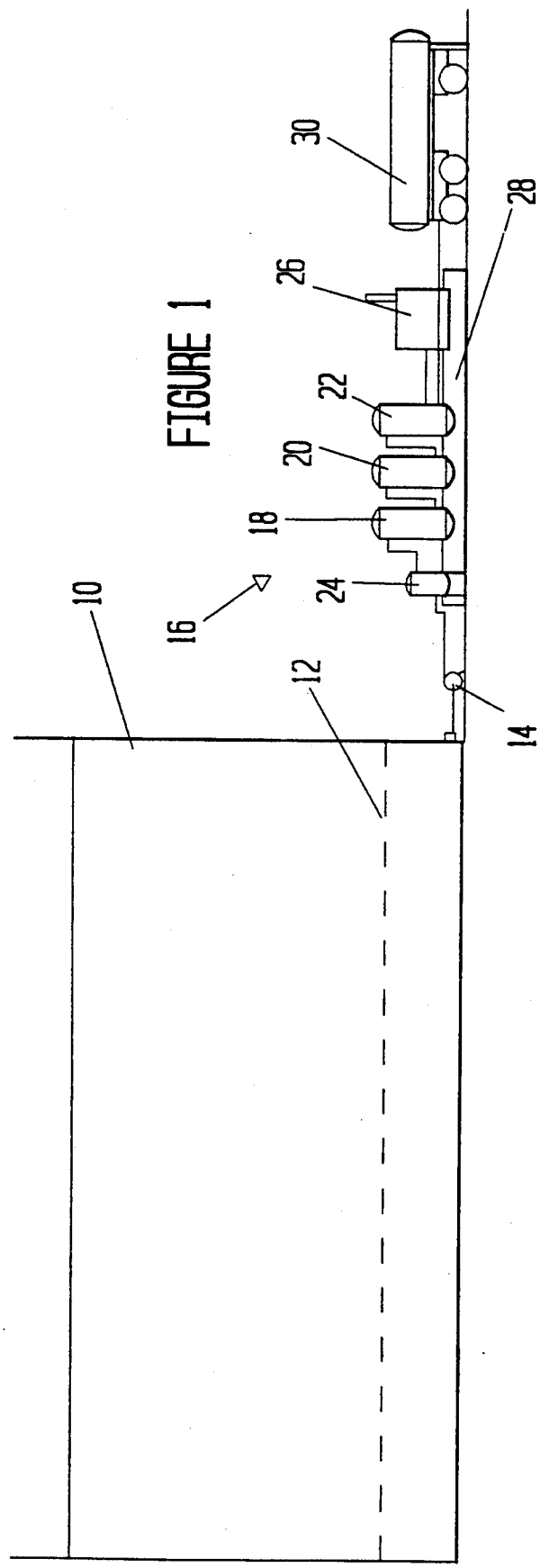
FIG. 1 illustrates a typical application of the invention using indirect cryogenic cooling.

Referring now to FIG. 1, the invention is illustrated as applied to the a typical petroleum distillate bulk storage tank 10. Commonly these tanks have diameters from 50 to 150 feet, usually about 75 feet. When used for storage of volatile products such as gasoline, the tanks also have a floating roof 12 which floats or rests on the level of liquid contained within the tank. The floating roof descends to a minimum height of 6 feet in the tank, and when the tank is emptied of liquid it contains a volume of a air/vapor mixture corresponding to the 6 foot high interior chamber within the tank. The volume of air/vapor mixtures which must be vented and treated from such tanks is from 18,000 to about 50,000 cubic feet.

The air and vapor mixture contained within this residual tank volume must be thoroughly flushed and replaced with fresh air before workmen can enter the tank during cleaning operations. Heretofore, this has been accomplished by blowing fresh air into the tank while exhausting the tank to the atmosphere. Usually from two to about ten volumes of fresh air per volume of air/vapor mixture within the tank must be introduced as flushing air into the tank before the level of hydrocarbons in the vapor space of the tank is at a sufficiently safe level for workmen. Accordingly, the total volume of air/vapor which must be passed to the treatment facilities of the invention is from 30,000 to 50,000 cubic feet, depending on the exact tank volume and the volumes of fresh air that must be used.

The air/vapor discharged from the tank is treated by the treatment facility 16 of the invention which is illustrated to the right of the tank 10 in FIG. 1. The treatment facility 16 comprises a blower 14, several condenser vessels 18, 20 and 22, a caustic wash vessel 24 and a solid absorbent treatment vessel 26. Preferably these vessels are all mounted on a portable unit such as on a skid 28 or on a wheeled vehicle that permits location of the facility immediately adjacent to the tank 10 which is destined for cleaning FIG. 1 also illustrates a storage tank (or trailer) 30 of liquid nitrogen for the cryogenic operation of the train of condensation stages. Typically, the treatment of the vapors in conventional bulk storage tanks will require a supply from 1500 to about 5000 gallons of liquid nitrogen, and this amount can be supplied readily to any location using conventional truck/trailer transportation.

Figure 2:
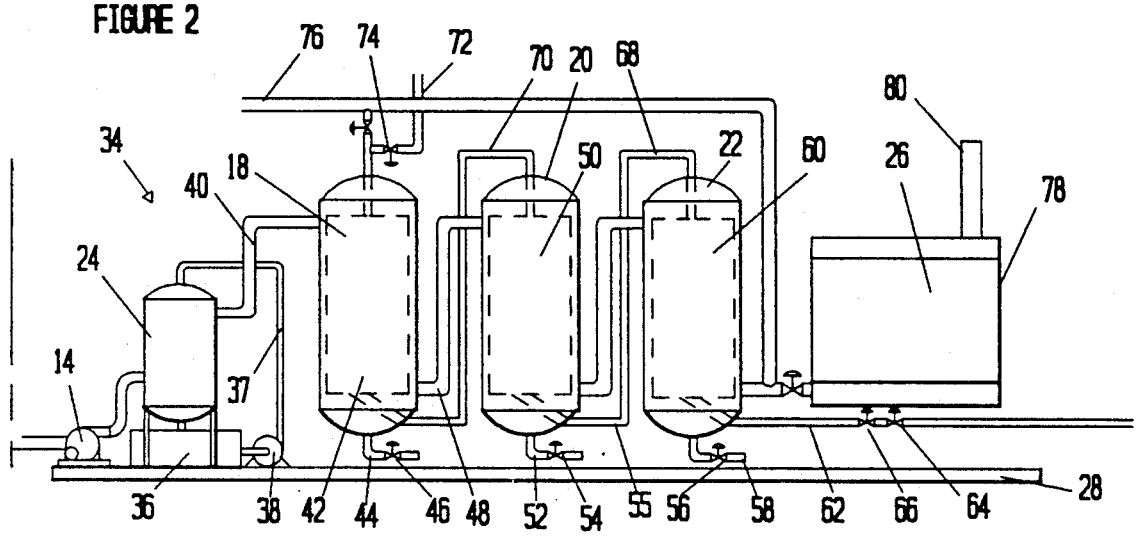
FIG. 2 is an enlarged view of the vapor treatment facilities used in the application shown in FIG. 1.

Referring now to FIG. 2, the treatment facility is illustrated in greater detail. As there illustrated, the bulk storage tank is evacuated with a conventional blower 14 having a capacity from 1000 to about 5000 cubic feet per minute and the air/vapor mixture is discharged into the first stage 34 of the treatment facility. This stage employs a caustic wash treatment in vessel 24 in which the air/vapor mixture is passed counter-current to a spray of caustic, typically aqueous solutions of about 30 weight percent sodium hydroxide to remove sulfur compound from the air/vapor mixture such as mercaptans, hydrogen sulphate, sulfur dioxide and the like. The caustic solution is effective in removing the sulfur compounds which remain dissolved in the liquid and accumulate in the caustic wash tank 36. A liquid pump 38 removes the solution from the tank 36 and recycles it to a spray nozzle in the upper region of the vessel 34 through line 37.

The treated vapors are then passed through line 40 to the first condenser vessel 18 where they are passed in indirect heat exchange with a cryogenic cooling fluid. The vapors are passed over the external surfaces of an indirect heat exchange tube bundle 42 represented by the hidden object lines within the condenser vessel 18. Each of the tube bundles in the stages of the condenser train has a surface area of about 900 square feet. The first stage of condensation is operated with sufficient cooling to reduce the temperature of the air/vapor mixture to approximately 40 degrees F., sufficient to condense substantially all moisture within the air/vapor mixture. The moisture accumulates on the heat exchange surfaces and drains to the bottom of the condenser vessel 18 and is removed therefrom through line 44 as controlled by flow control valve 46.

The air/vapor mixture is then passed through conduit 48 to condenser vessel 20, which is the first hydrocarbon condensation stage. This stage is operated with sufficient cooling to reduce the temperature of the air/vapor mixture to about −40 degrees F., sufficient to condense the heavier hydrocarbon fractions within the air/vapor mixture. The heavier hydrocarbons condense on the external surfaces of the indirect heat exchange tube bundle 50 within vessel 20 and drain to the bottom of the vessel from where they are removed through line 52 as controlled by flow control valve 54.

The vapors which have been reduced in hydrocarbon content are then removed from the condenser vessel 20 and are passed through line 55 to the final condenser vessel 22, where the mixture is cooled to a temperature of −100 degrees F., or less. This cooling is sufficient to condense substantially all the hydrocarbon content of the air/vapor mixture. The condensed hydrocarbons condense on the external surfaces of the tube bundle 60 and drain to the bottom of the condenser vessel 22, from where they are removed through a line 56 at a flow rate which is controlled by valve 58.

The indirect heat exchange bundles 42, 50 and 60 are supplied with a cryogenic liquid, preferably liquid nitrogen, through supply line 62. The liquid nitrogen is expanded through valves 64 and 66 and directed into the tubes of the first indirect heat exchange bundle 60. The nitrogen is then passed through line 68 to the heat exchange tubes of the heat exchange bundle 50 in the intermediate condenser vessel 20, from where it is passed through line 70 into the tube bundle 42 of the first condenser vessel 18.

The nitrogen can then be vented through line 72 to the atmosphere as controlled by valve 74. Alternatively, the nitrogen can be introduced to the bulk petroleum storage tank 10 as a source of the flush gas therein by discharging it into the air recycle line 76.

The treated air removed from the final condenser vessel 22 is passed to a final treatment in adsorbent vessel 26, where it contacts a solid adsorbent 78. Preferably, the majority of the treated air is recycled to the bulk petroleum storage tank through line 76 as a supply of flush air. The air which is exhausted from the treatment facility through the exhaust stack 80 has received a final purification by the direct contact with a solid adsorbent 78 which is present as a bed of granular solid within the treatment zone 26. Various solids can be used for this purpose, preferably activated charcoal is used, however other solids such as silica gel, molecular sieves, etc. can also be used for this purpose.

Figure 3:
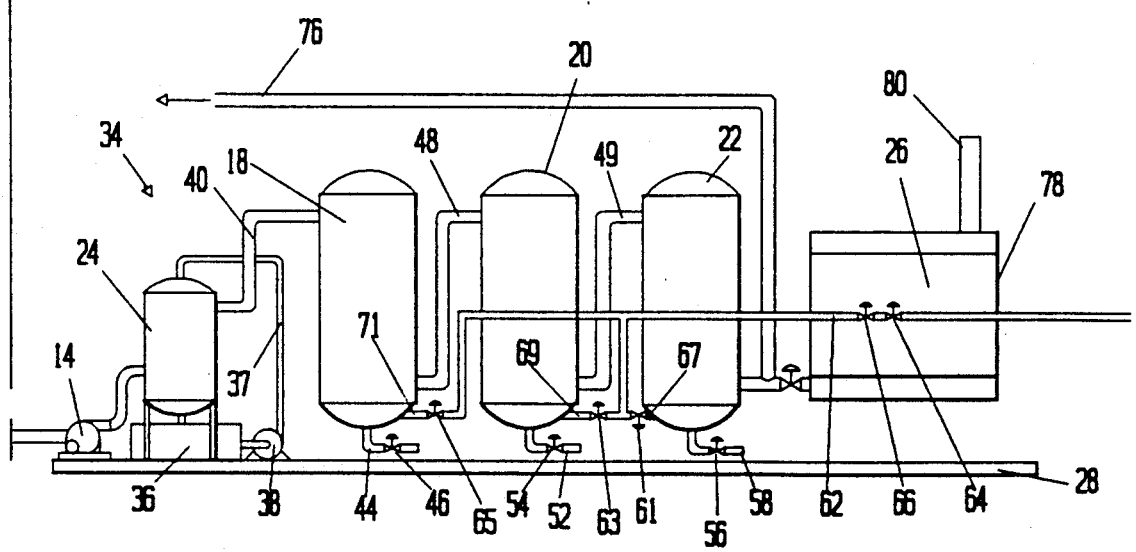
FIG. 3 illustrates an application of the invention using direct contact, cryogenic cooling.

Referring now to FIG. 3, the invention is illustrated for an application using direct cryogenic cooling. In this illustration, many of the components are the same as previously described, and are identified with the same number as for FIG. 2. The caustic wash facilities are the same and include a caustic wash vessel 24, with a caustic recirculation pump 38 and a caustic supply tank 36. The air/vapor mixture is passed to the first stage condenser vessel 18 through line 40. In vessel 18, the air/vapor mixture is mixed with expanded nitrogen gas that is admitted through line 71 at a rate which is controlled by valve 65. Sufficient liquid nitrogen is atomized through expansion nozzles to provide cold nitrogen gas in adequate quantities to cool the air/vapor mixture to a temperature of about 40° F., thereby condensing the moisture in the mixture.

The dehumidified mixture is passed to the second condensation stage within vessel 20, through line 48. In vessel 20, the air/vapor and nitrogen mixture is mixed with cold nitrogen gas supplied through line 69 which, as described above, is sufficient to cool the mixture to a temperature of about −40° F. The heavier hydrocarbons are condensed and removed through line 52, and the resulting mixture is passed to vessel 22 through line 49. Cold nitrogen gas is added to the mixture through line 67 at a rate controlled by valve 61 to cool the mixture to a temperature no greater than −100° F. Thereafter the treated air can be recycled through line 76 to the bulk storage tank 10 (see FIG. 1) as a source of fresh air, or can be vented, preferably after being passed through the adsorbent in vessel 26, as previously described.

Referring now to FIG. 4, another direct contact cryogenic cooling process is illustrated. In this application, the first, caustic wash stage is the same as previously described, with a caustic wash vessel 24, recirculation pump 38, caustic storage tank 36 and piping 37. This stage is, as before, optional, depending on whether sulfur contaminates are present in the vapor/air mixture. The second stage is a water condensation stage in vessel 88, which is 24 inches in diameter. The vessel contains a bed 90 of Pall rings which is 30 inches in height. The vapor/air mixture passes through the bed 90 countercurrent to water which is applied to the top of the bed with a spray head (not shown) on the end of pipe 92. The water in the vapor/air mixture condenses and is removed through a bottom nozzle 94 and passed by pump 96 through a water cooler 98. The water is passed through a fin-tube heat exchanger 100 in the water cooler 98 where it is cooled by indirect heat exchange with the cooled and purified air stream introduced into the cooler 98 by conduit 102. The temperature of the water is controlled to slightly less than 40° F. by expanding and introducing nitrogen through control valve 104 in nitrogen supply line 106. For this purpose, a temperature indicator controller 108 is provided with a temperature sensor 109 in the water outlet line 110 from the cooler 98. The cooled water is passed through line 110 to line 92 as a supply of cooling water for vessel 88.

The water which is condensed in vessel 88 is removed through line 44 as controlled by valve 46. The dehumidified vapor/air mixture is withdrawn through nozzle 89 after passing through a demister 91 which is located in the top of vessel 88. The demister can be a woven mesh of plastic or metal which is positioned immediately below the vapor exit nozzle to remove any entrained condensate from the vapor/air stream leaving the vessel 88.

The succeeding stage of the treatment facilities 34 comprises a fractional condensation tower 112. This tower has two condensation stages 114 and 116. Each stage has a packed bed 117 of Pall rings and is 48 inches in height. Liquid nitrogen from supply line 62 is expanded and introduced into each stage through control valves 118 and 120 which are in supply lines 122 and 124. The temperature controller 126 for valve 118 has a temperature sensor 130 in the first condensation stage 116 with a control temperature of at least −40° F. The heavier hydrocarbon fraction in the vapor/air mixture is condensed in stage 116 and is removed from the bottom of tower 112 through line 52 at a rate controlled by valve 54. The remaining hydrocarbons are condensed in stage 114 and collect on liquid draw off tray 132 through line 134 at a rate controlled by valve 136. Nitrogen is introduced into stage 114 through line 124 at a rate sufficient to maintain the temperature, as detected by temperature sensor 136, at −100° F., or slightly below −100° F. The tower 112 also has a demister 148, which removes any entrained hydrocarbon condensate from he air stream leaving the tower.

As previously mentioned, the purified air stream is passed to the water cooler 98 through line 102, and exits the water cooler through line 140. The purified air can be passed to a final stage of purification in adsorption vessel 26, where it contacts a packed bed of adsorbent 78, preferably activated carbon, prior to being discharged to the atmosphere through stack 80. Alternatively, some or all of the purified air can be recycled to tank 10 through line 76 as a source of a flushing gas which is passed through the tank and treatment facilities.

The invention will now be illustrated by the following example which will serve to demonstrate results obtainable thereby.

EXAMPLE

A floating roof gasoline storage tank which is 110 feet in diameter is to be cleaned. The treatment facilities illustrated in FIG. 4 are connected to a bottom nozzle of the tank. The floating roof of the tank is lowered to a level of 6 feet above the bottom when the tank is drained of all liquid, thereby providing a volume within the tank of about 57,000 cubic feet.

Fresh air is introduced into the upper portion of the tank and the tank contents are evacuated and passed to the treatment facility of this invention at a flow rate of 1,000 to 5,000 cubic feet per minute. The air/vapor mixture within the tank initially contains approximately 35 percent hydrocarbons. When there are volatile sulfur compounds in the air/vapor mixture, the mixture is passed to the caustic treatment facility and a 30 weight percent aqueous sodium hydroxide solution is circulated at a flow rate of 50 gallons per minute into contact with the air/vapor mixture. The contacting is performed within a vessel containing four feet of 2 inch Tellerette TM inert packing.

The air/vapor mixture is passed through conduits 18 inches in diameter to three successive stages of the condenser train. During the operation of the system, the air in the bulk storage tank is flushed with a minimum of 2.5 volumes of fresh air, and the treatment extends over a period of 6 to 20 hours.

Liquid nitrogen is supplied to the condenser train at a flow rate of about 150 to 300 gallons per hour, which is sufficient to maintain an air temperature in the final stage of 100 degrees F. The operation is conducted substantially as previously described for FIG. 4. The air which is exhausted to the atmosphere is passed through a bed of activated carbon having a depth of two to three feet in an absorber vessel 6 feet in diameter and 10 feet long.

The treatment is effective to recover over 90% of the hydrocarbons contained within the air vapor mixture of the tank. The total recovery of gasoline from the treatment is 6000 gallons of gasoline. The total cost for the liquid nitrogen is $3500.00, and the value of the recovered gasoline has a market value of $1.00 per gallon. A substantial cost of the liquid nitrogen is more than offset by the value of the recovered hydrocarbons.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. In a method for cleaning a stationary petroleum storage tank which is permanently located at a tank station and which has a capacity of at least 5000 barrels, wherein the tank is emptied of its liquid contents, and ventilated until it is safe for workmen to enter the tank to wash the walls and interior thereof, the improved method of reducing the hydrocarbon content in the air/vapor mixture occupying the vapor space within said tank prior to workmen entering said tank without discharging said air/vapor mixture to the atmosphere, which comprises:
   a. moving a portable vapor treatment facility having a condenser train with a first condenser stage, a second condenser stage, and a final condenser stage to said tank station and connecting said condenser train to said tank;
   b. connecting a portable supply of liquid nitrogen to said condenser train;
   c. withdrawing the air/vapor mixture from said tank and passing it to said condenser train;
   d. condensing water vapor contained within said air/vapor mixture in a first condenser stage, and separating the condensed water from an air/hydrocarbon mixture therein;
   e. passing the air/hydrocarbon mixture to a succeeding condenser stage, and condensing higher boiling hydrocarbons therein;
   f. passing the resultant air and volatile hydrocarbons to a final condenser stage, and controlling the temperature within said final condenser stage to a temperature not greater than $-100°$ F.;
   g. exhausting said air from said final condenser stage; and
   h. maintaining the condensation temperatures in said condenser stages by expanding liquidified nitrogen from said portable supply of liquid nitrogen and passing the expanded nitrogen to said condenser train into heat transfer contact with said air/vapor mixture; and
   i. recycling said air to said tank.

2. The method of claim 1 wherein said contacting is achieved by passing liquidified nitrogen to said condenser train and evaporating said nitrogen to absorb heat within said condensers in indirect heat exchange relationship with said air/vapor mixture.

3. The method of claim 2 wherein said nitrogen is passed through said condenser train in countercurrent flow to said air/vapor mixture.

4. The method of claim 3 wherein said nitrogen is passed from said first condenser stage to said tank to mix with the air/vapor mixture therein.

5. The method of claim 1 wherein said air removed from said final condenser stage is passed into contact with a solid adsorbent for hydrocarbons.

6. The method of claim 5 wherein said solid adsorbent is activated carbon.

7. The method of claim 1 wherein the temperature of the air/vapor mixture in said final stage is reduced to at least $-100°$ F.

8. The method of claim 1 wherein the temperature of the air/vapor mixture in said first stage is reduced to $40°$ F.

9. The method of claim 1 wherein the temperature of the air/vapor mixture in said succeeding condensation stage is reduced to $-40°$ F.

10. The method of claim 1 wherein the temperature of the air/vapor mixture in said final stage is reduced to a value sufficient to condense at least 90% of the hydrocarbons present in said air/vapor mixture which is withdrawn from said tank.

11. The method of claim 1 including the step of introducing air into the tank as flushing air while withdrawing said air/vapor mixture therefrom.

12. The method of claim 11 wherein from two to ten volumes of flushing air are introduced into said tank while withdrawing said air/vapor mixture from said tank.

13. The method of claim 12 wherein the total volume of said air/vapor mixture which is withdrawn from said tank is from about 30,000 to about 500,000 cubic feet.

14. The method of claim 13 wherein a quantity from 1500 to about 5000 gallons of liquid nitrogen are supplied to said condensing train from said portable supply of nitrogen.

15. The method of claim 1 wherein said air exhausted from said final condenser stage is recycled to said tank in a mixture with fresh air as the source of flushing air introduced therein.

16. The method of claim 1 wherein nitrogen after passage into contact with said air/vapor mixture, is passed from said condensing train to said tank as a source of flushing air therein.

* * * * *